United States Patent [19]

Bonko

[11] Patent Number: 4,982,773

[45] Date of Patent: Jan. 8, 1991

[54] PNEUMATIC TIRE INCLUDING SPACED SIDEWALL PROJECTIONS

[75] Inventor: Mark L. Bonko, Hartville, Ohio

[73] Assignee: The Goodyear Tire & Rubber Company, Akron, Ohio

[21] Appl. No.: 331,714

[22] Filed: Apr. 3, 1989

[51] Int. Cl.$^5$ .............................................. B60C 13/02
[52] U.S. Cl. ................................ 152/209 B; 152/523; D12/152
[58] Field of Search ................ 152/523, 209 B, 209 R, 152/209 D, 208, 525; D12/152, 149–151

[56] References Cited

U.S. PATENT DOCUMENTS

| D. 120,687 | 5/1940 | Moonan | D12/152 |
| D. 293,093 | 12/1987 | Nishio . | |
| D. 300,622 | 4/1989 | Furusawa | D12/149 |
| 2,800,098 | 7/1957 | Crosby | 116/34 |
| 2,972,368 | 5/1958 | Williams | 152/209 |
| 3,457,981 | 7/1969 | Verdier et al. | 152/209 |
| 3,811,488 | 5/1974 | Duncan | 152/523 X |
| 4,201,261 | 5/1980 | Bartley et al. | 152/357 |
| 4,711,283 | 12/1987 | Bonko et al. | 152/209 |

FOREIGN PATENT DOCUMENTS

| 344524 | 7/1978 | Austria . |
| 0014256 | 12/1979 | European Pat. Off. . |
| 738045 | 7/1943 | Fed. Rep. of Germany . |
| 163051 | 5/1949 | Fed. Rep. of Germany . |
| 1452787 | 9/1966 | France . |
| 2095395 | 2/1972 | France . |
| 2159267 | 6/1973 | France . |
| 2329464 | 5/1977 | France . |
| G291191 | 6/1986 | Japan . |
| 1000465 | 5/1981 | United Kingdom . |

Primary Examiner—Michael W. Ball
Assistant Examiner—Geoffrey L. Knable
Attorney, Agent, or Firm—David L. King; Roger D. Emerson

[57] ABSTRACT

A pneumatic tire design primarily for off road use has a pair of bead regions, a ground-engaging tread, and a pair of sidewalls between the beads and the tread. The inner tread surface between tread lugs and the tread edges has curvature in both the axial and circumferential directions. A series of projections are integral with a sidewall and are arranged in a circular pattern. Each projection is axially adjacent and axially outward of a portion of the inner tread surface and outwardly of the sidewall and is interposed between lateral tread lugs. The projections and lateral tread lugs are positioned to provide a means for deflecting radially directed debris away from the sidewalls. The sidewalls are protected without requiring circumferentially continuous projections.

3 Claims, 5 Drawing Sheets

PNEUMATIC TIRE INCLUDING SPACED SIDEWALL PROJECTIONS

BACKGROUND OF THE INVENTION

1. Field of Invention

The present invention relates generally to pneumatic tires and more specifically to pneumatic tires designed to be used primarily off the road, and even more specifically to farm tires.

2. Description of the Related Art

Pneumatic tires designed primarily for off-the-road use often feature an "open" tread pattern with a lower net-to-gross ratio than tires intended for highway use. Off-the-road tires also commonly feature laterally extending tread lugs which cut into the loose ground surface. The subject invention features such a tread, some aspects of which are discussed in U. S. Pat. No. 4,711,283.

Pneumatic tires have featured various devices to protect the sidewall area of the tire from damage. One such device, a scuff rib, is a continuous rib of rubber which protrudes axially outward from the sidewall to be protected. Some tires feature a "broken" or "interrupted" scuff rib which is not continuous but performs a similar function. Examples include U. S. Pat. No. 2,800,098, French Application No. 2,159,267, German Application No. 738,045, and French Application No. 2,095,395. Occasionally tire treads feature axially extending lugs to improve traction in snow or in loose dirt. Such lugs are commonly found on farm tires. Often, sidewall protrusions on such tires are located axially outward of the lateral edges of such lugs as seen in U.S. Pat. No. 3,457,981. Occasionally, the sidewall protrusions are located axially outwardly of the portion of the inner tread surface interposed between the tread lugs as in British Design Patent No. 1,000,465. Under some conditions, the sidewall protrusions have caused cracking in the sidewall area, leading to premature failure of the tire.

SUMMARY OF THE INVENTION

A tire according to the present invention comprises a pair of bead regions. A ground-engaging tread has a net-to-gross ratio in the range from 25% to 40% and extends circumferentially about the bead regions. The tread has circumferentially-spaced center and lateral tread lugs projecting radially from the tread surface. The axially outermost surface of the lateral tread lug is adjacent to the sidewall. The lateral tread lugs are substantially parallel to one another on each side of the tire's equatorial plane and extend axially inwardly from a tread edge, the parallel lateral lugs forming with the inner tread surface a soil discharge area. During tire use, soil is pushed axially outwardly. The inner tread surface between tread lugs and the tread edges has curvature in both the axial and circumferential directions. A pair of sidewalls extend between each bead region and the tread. A series of projections are integral with a sidewall and are arranged in a circular pattern. Each projection is axially adjacent and axially outward and radially equal or inward of the inner tread surface and outwardly of the sidewall and is interposed between lateral tread lugs. The projections and lateral tread lugs are positioned to provide a means for deflecting debris away from the sidewalls during tire use. The sidewalls are protected without requiring circumferentially continuous projections.

BRIEF DESCRIPTION OF THE DRAWINGS

Other aspects of the invention will become apparent from the following description when read in conjunction with the accompanying drawings wherein.

DESCRIPTION OF THE PREFERRED EMBODIMENT

The invention also may be better understood in the context of the following definitions, which are applicable to both the specification and to the appended claims:

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner tread surface" means that part of the tread between the protruding tread lugs.

"Net-to-gross ratio" means the ratio of the area of the tire tread which normally makes contact with a paved road surface while in the footprint, divided by the area of the tread in the footprint, including non-contacting portions such as the inner tread surface.

"Outer tread surface" means the radially outermost surface of the protruding tread lugs.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Radial" and "radially" are used to mean directions radially toward or away from the axis of rotation of the tire.

"Sidewall" means that portion of a tire between the tread and the bead.

"Tread" means that portion of a tire that comes into contact with the road when the tire is normally inflated and under normal load.

Figure 1:
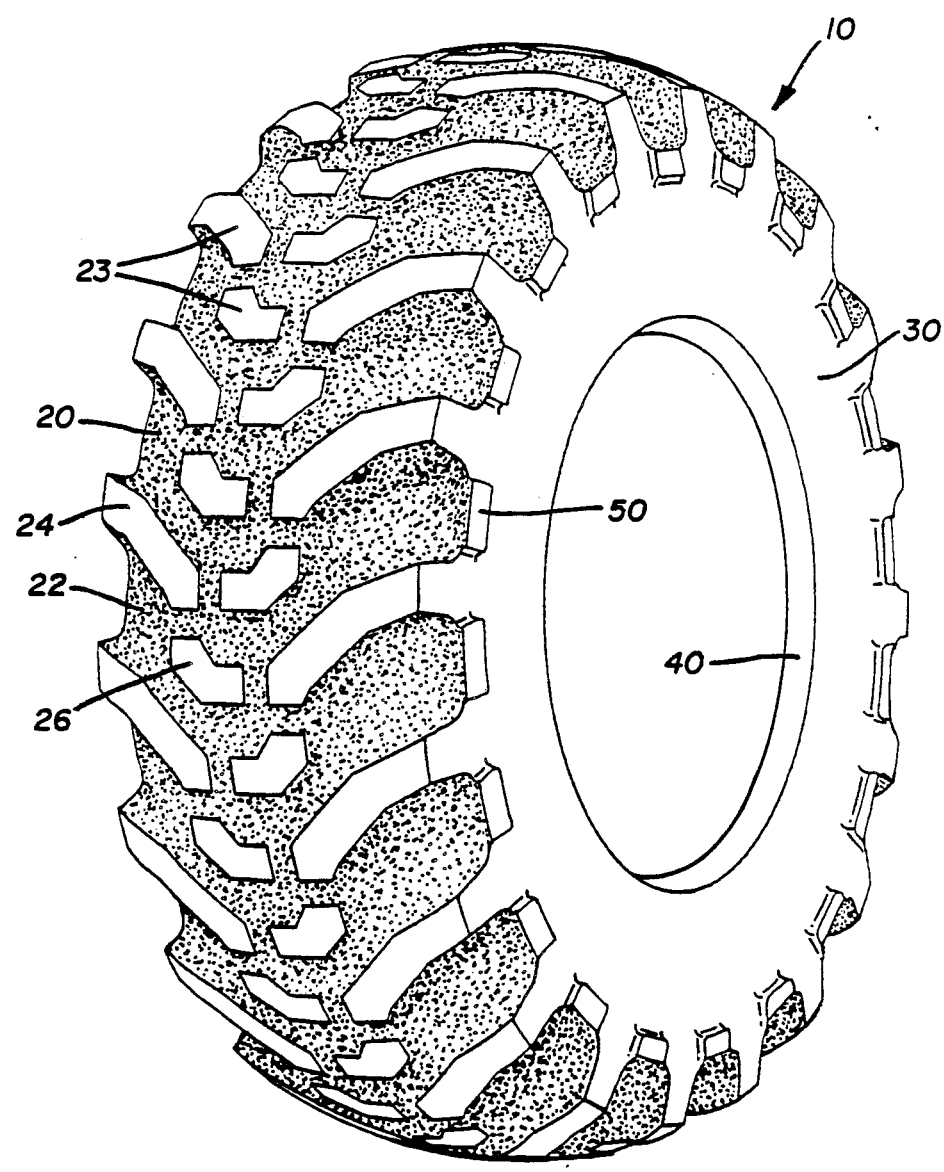
FIG. 1 is a 30 degree perspective view of a tire according to the present invention.
Figure 2:
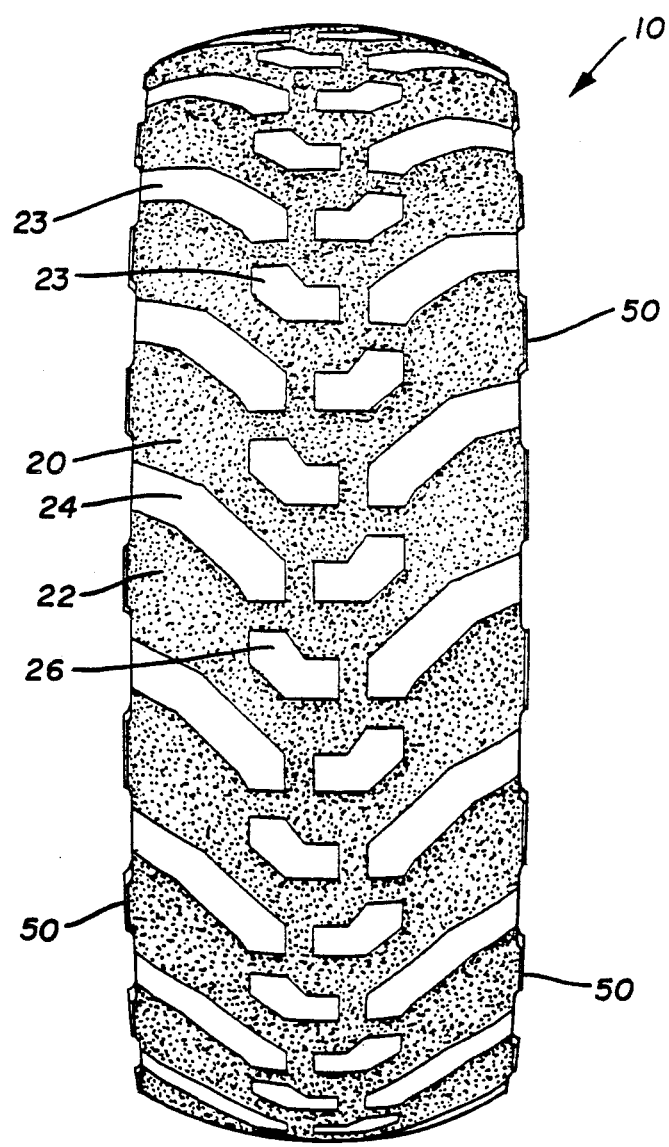
FIG. 2 is a zero degree perspective view of a tire according to the present invention.
Figure 3:
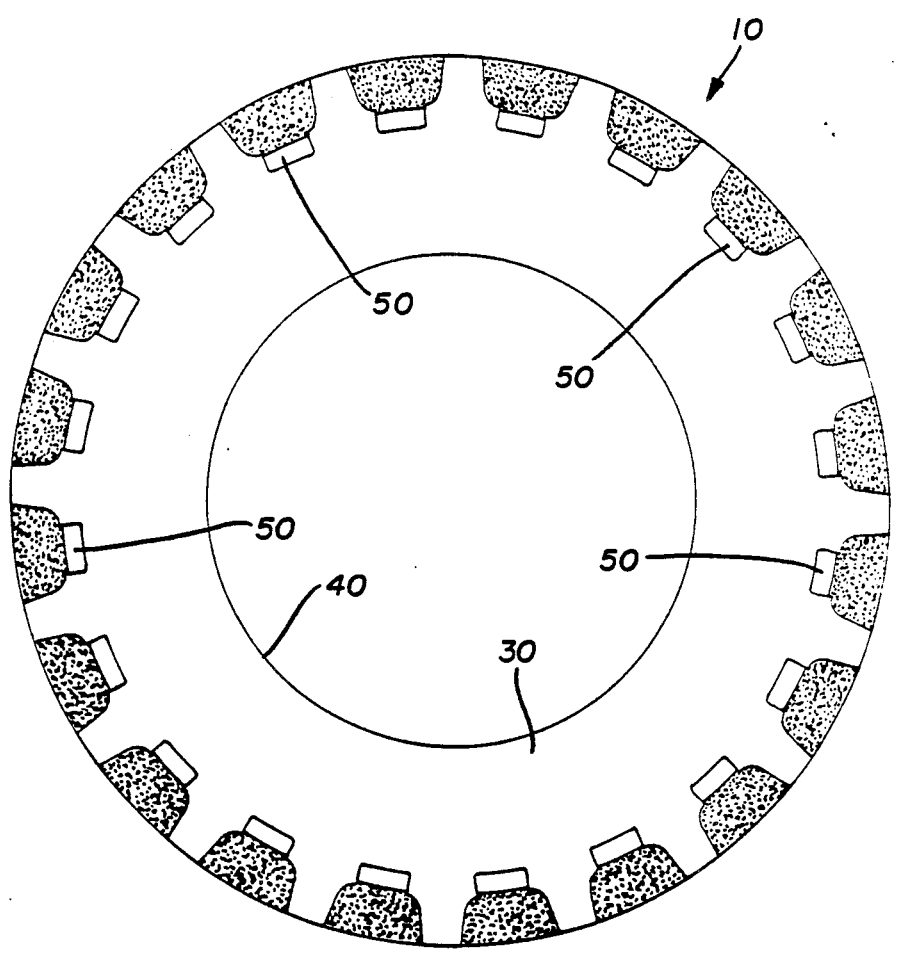
FIG. 3 is a side view of a tire according to the present invention.

In the drawings, the same numerals are used for the same components or items in the several views. With particular reference now to FIG. 1, there is illustrated a pneumatic tire 10 designed primarily for off-road use.

The tire 10 has a directional tread 20. From the inner tread surface 22 protrude axially extending lateral lugs 24 and center lugs 26. The inner tread surface between tread lugs and the tread edges has curvature in both the axial and circumferential directions. In a tire designed primarily for off-road use, as that shown in FIG. 1, the area of the inner tread surface between the protruding tread lugs 24,26 usually contacts the ground surface. In normal operation, the lateral lugs and center lugs cut into the loose ground surface and provide means for axial traction and lateral stability while the inner tread surface provides flotation and supports the weight of the vehicle. The net-to-gross ratio of the tire can range from 25% to 40%, with the preferred design being 32%. Often a tire designed primarily for off-road use must be driven on paved road surfaces. In such cases, only the outer tread surface 23 contacts the road surface. In a tire designed for a more conventional highway application, the area of the inner tread surface 22 between the protruding tread lugs 24,26 does not contact the road surface. In such a tire, the net-to-gross ratio of the tread is much higher, on the order of 75%, and the tread surface between the protruding tread lugs is in less danger of damage from the road or ground surface.

A pair of sidewalls 30 extends between the tread 20 and the bead regions 40. A series of projections 50 are integral with a sidewall and are arranged in a circular pattern. Each projection is axially adjacent and axially outward of a portion of the inner tread surface and is interposed between tread lugs. It is believed that this portion of the tire sidewall is most susceptible to damage from snags. This area of the inner tread surface operates as the soil discharge area in that the lateral lugs cut into the ground surface and push the loose soil axially outwardly past the tread surface. Additionally, the radially extending lateral lug will protect the axially adjacent sidewall area in some cases by deflecting radially directed debris. While a continuous protruding rib located on a sidewall at the same position as the projections would also protect the regions of the sidewall between the lateral lugs, the current invention offers material and weight savings.

Figure 5:
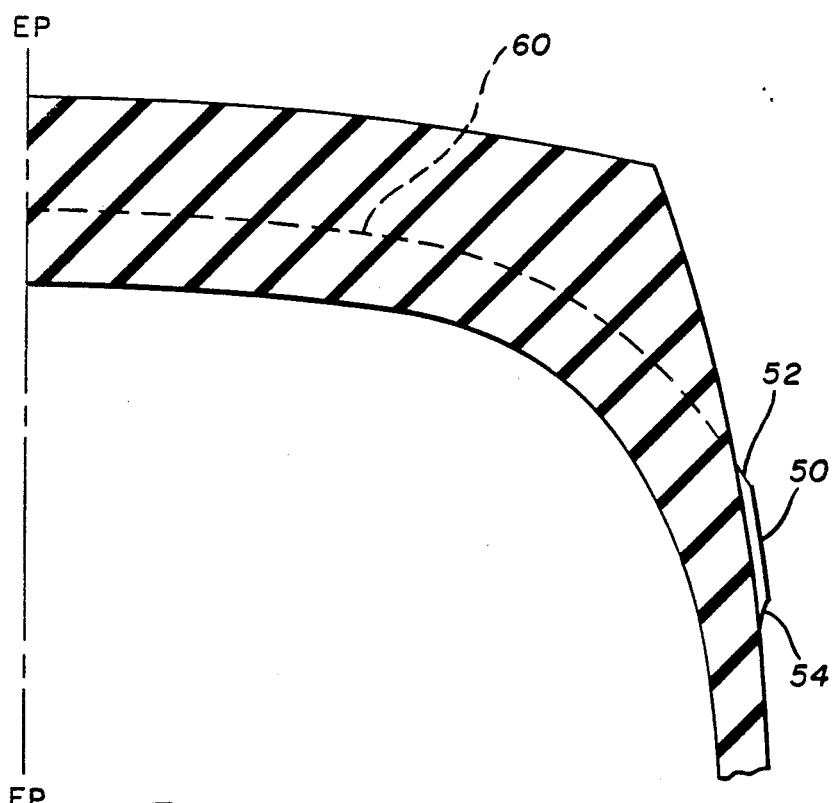
FIG. 5 is a schematic, cross-sectional view of one half of a tire according to the present invention.

In the past, such interrupted or broken sidewall projections have occasionally cracked, causing premature failure of the tire. The current design features an improved bracing technique which lowers the stress and contributes to long, useful tire life. Referring to FIG. 5, there is illustrated a broken line 60 which describes the inner tread surface 22 in the area between the protruding lateral lugs 24 and center lugs 26. This line is convexly curved in the axial direction. In the preferred embodiment, the curve has a single radius of curvature. The radially outermost surface 52 of the projection 50 follows the same radius of curvature of the inner tread surface. In this way, the radially outermost surface of the projection is an extension of the inner tread surface between the lateral lugs. By designing the radially outermost surface of the projections in this way, stresses in this region are minimized. Because this portion of the projection more frequently encounters ground surface debris, it is important that stresses be reduced and that this portion of the projection be strengthened and braced in an appropriate manner.

Figure 4:
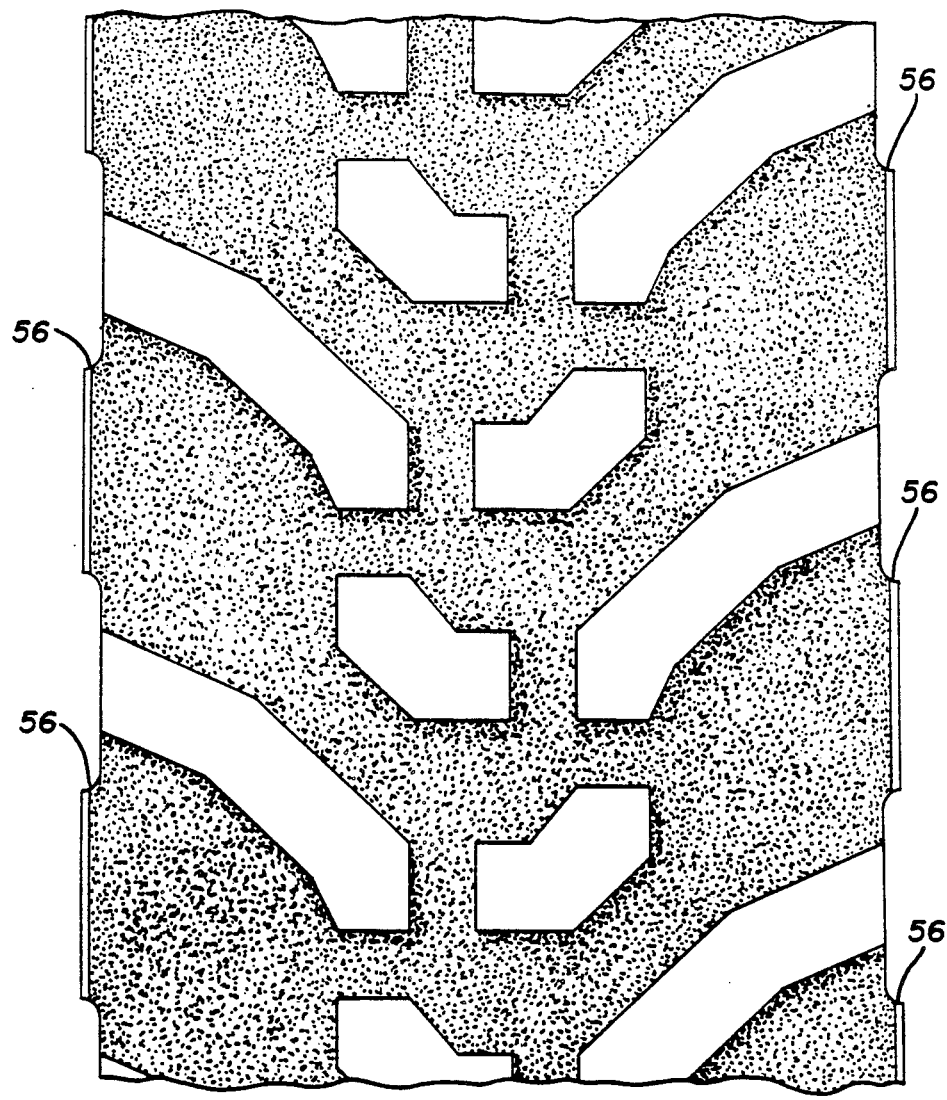
FIG. 4 is a plan view of a section of a tire according to the present invention.
Figure 6:
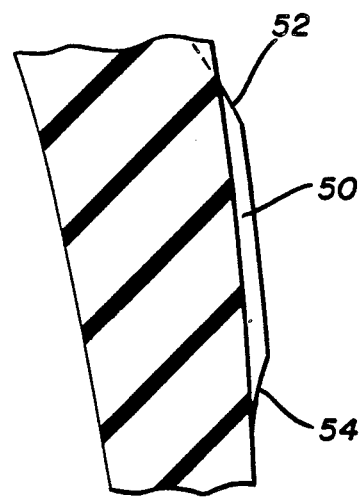
FIG. 6 is an enlarged view of the sidewall projection shown in FIG. 5.

The radially innermost surface 54 of the projection 50 also features a tapered edge where it interfaces with the sidewall 30. The axial surfaces 56 of the projection are also tapered as seen best in FIG. 4. The stresses at the radially innermost surface and axial surfaces of the projection are not as critical as those at the radially outermost surface. Therefore these surfaces may be joined to the sidewall in a variety of ways which are aesthetically pleasing and do not unnecessarily limit the performance or durability of the tire. The design of the radially innermost surface and axial surfaces of the projection shown in FIGS. 4–6 were chosen for their low stress levels and appearance. The axial surfaces 56 of the projection are also tapered as seen best in FIG. 4.

Based on the foregoing description of the invention, what is claimed is:

1. A pneumatic tire designed primarily for off-road use, the tire comprising:
    a pair of bead regions;
    a pair of sidewalls;
    a ground-engaging tread, the respective sidewalls extending between respective beads and the tread, the tread having a net-to-gross ratio in the range from 25% to 40% and having circumferentially spaced center lugs and lateral tread lugs projecting radially from an inner tread surface and the lateral tread lugs being substantially parallel to one another on each side of the tire's equatorial plane and extending axially inwardly from a tread edge, the axially outermost surface of the lateral tread lug being adjacent to the sidewall, the inner tread surface between the tread lugs and at the tread edges having curvature in both the axial and circumferential directions, the parallel lateral lugs forming with the inner tread surface a soil discharge area, the soil during tire use being pushed axially outwardly;
    a series of projections integral with the sidewall, the projections being arranged in a circular pattern, each projection being axially adjacent and axially outward and radially equal or inward of the inner tread surface and outwardly of the sidewall, each projection being interposed between lateral tread lugs and having a radially outermost surface which has the same curvature in the axial direction as the adjacent inner tread surface and is an axial continuation of the inner tread surface; and
    the projections being positioned to provide during tire use deflection of soil and debris away from the sidewalls, the sidewalls being protected around the circumference of the tire by axial discharge of the soil and debris from the inner tread surfaces over the adjacent discontinuous sidewall projections.

2. A tire as in claim 1, wherein the radially outermost surface of the projections and the inner tread surface have a single radius of curvature in the axial direction.

3. A pneumatic tire as in claim 2 wherein the tire has a net-to-gross ratio approximately equal to 32%.

* * * * *